United States Patent [19]

van Brederode et al.

[11] 4,225,650
[45] Sep. 30, 1980

[54] CROSSLINKABLE POLYMER POWDER AND LAMINATE

[75] Inventors: Robert A. van Brederode, Baytown, Tex.; Robert A. Steinkamp, Baton Rouge, La.

[73] Assignee: Exxon Research & Engineering Co., Florham Park, N.J.

[21] Appl. No.: 624,959

[22] Filed: Oct. 22, 1975

[51] Int. Cl.$^2$ .................. B32B 27/00; B32B 5/16
[52] U.S. Cl. .................... 428/405; 428/407; 428/429; 428/447; 525/342; 525/387
[58] Field of Search .............. 428/405, 407, 429, 447; 526/29, 57

[56] References Cited

U.S. PATENT DOCUMENTS

| | | | |
|---|---|---|---|
| 2,859,202 | 11/1958 | Bobear | 428/429 |
| 3,650,814 | 3/1972 | Elder | 428/429 |
| 3,699,186 | 10/1972 | Schrage | 526/29 |
| 3,804,919 | 4/1974 | Schrage | 428/429 |
| 3,903,339 | 9/1975 | Brockway | 428/429 |
| 3,919,143 | 11/1975 | Morris | 526/29 |

FOREIGN PATENT DOCUMENTS 704812  3/1965 Canada ................................. 428/429

Primary Examiner—Ellis P. Robinson
Attorney, Agent, or Firm—D. A. Roth; Myron B. Kurtzman

[57] ABSTRACT

A fusable powder composition comprising a cross-linkable organic polymeric material of less than 75 micron size, an organic peroxide, and preferably for some polymers an organosilicon compound for forming polymeric coatings on substrates such as glass or metal.

24 Claims, 2 Drawing Figures

CROSSLINKABLE POLYMER POWDER AND LAMINATE

BACKGROUND OF THE INVENTION

This invention relates to finely divided normally solid, synthetic organic polymeric thermoplastic resins.

Thermoplastic polymers in powder or finely divided form have a wide variety of commercial applications, such as for example, the dry powders have been used to coat articles in dry form by dip coating in either static or fluidized beds, by electrostatic coating, spraying or dusting and flame spraying. The powders are used in dispersed form in suitable liquid carriers to apply coatings by roller coating, spray coating, and dip coating to a variety of substrates such as; glass, ceramics, metal, wood, cloth, paper, paperboard, and the like. The finely divided polymers have also been successfully employed in conventional powder molding techniques. The fine powders have also been applied as paper pulp additives, mold release agents, wax polish, paint compositions, binders for non woven fabrics and finishes for woven fabrics.

There are basically four types of processes employed in the prior art for preparing finely divided polymer particles, i.e., mechanical grinding, solvent precipitated, dispersion and spray atomization of solutions or slurries.

Generally mechanical grinding employs conventional equipment to yield particles of irregular shape and wide size variation of from about 75 to 300 microns. The powders produced by this method may not be suitable for applications where free flowing powders are required, since the irregular shapes may inhibit the flowability of these powders. The grinding of some polymer may be very costly because of the toughness of the resin even when cryogenically cooled.

The spray techniques are generally satisfactory for producing uniform non-agglomerated, spherical particles, however, very specialized equipment, usually nozzles operating under a limited range of conditions to prevent nozzle plugging are required. Substantial problems in spraying are the shearing of the polymer as it passes through the nozzle, premature precipitation of the polymer or rapid volatilization of solvent.

The dispersion method also is subject to high shear conditions. Frequently water is the dispersing medium and dispersing agents are used to facilitate the dispersion. Hence the powders produced by this technique generally incorporate some or all of the dispersing agent in the powder which can create undesirable changes in the original polymer properties, e.g., increased water sensitivity, loss of electrical insulating values, loss of adhesive capabilities, etc.

The final type of prior art process generally entails dissolving the polymer in a solvent, followed by precipitation of the polymer in finely divided form through addition of a nonsolvent, cooling or evaporation of the solvent or a combination of the above. Problems in this process have included difficulty in manipulating the solvents, solvent removal, particle agglomeration which requires a great deal of grinding, and particles having irregular somewhat rounded shapes.

Powders produced by grinding or emulsification of a polymer melt produces non-porous powder particles.

Coating of substantially non-porous substrates such as glass or metal has frequently been characterized by poor surface bonding or poor resistance of the bond to certain environments. Non-returnable glass bottles have been covered with polstyrene or polyethylene jackets or ionomer resin to reduce breakage and retain fragments if broken, however, these coatings are not intended to be permanently bonded. Even when a bond is obtained, it is usually the case that the resin or bond will not withstand the caustic rinses at 150° to 160° F. used on returnable bottles.

The objective of placing polymer coatings on returnable bottles is to reduce scratches and impact on the glass and hence increase the useful life of each bottle. The coating should also provide a safer bottle, reducing the likelihood of breakage, and in the event of breakage, contain the shattered glass or a portion thereof within the plastic skin.

SUMMARY OF THE INVENTION

Briefly stated, one facet of the present invention is a composition of matter for forming surface coatings which comprises a major amount of a finely-divided, e.g., powdered, relatively free-flowing, porous, organic thermoplastic polymeric material (capable of being fused and coalesced into a continuous film), having thereon a minor amount of a crosslinking agent for said material, usually an organic peroxide. And for certain polymeric materials, there also can be a minor amount of an organo functional silicon compound. Another facet of the invention in those instances where silanes are used for the laminate compositions resulting from application of the powder compositions on a suitable substrate, followed by crosslinking and fusing.

Generally, when the appropriate silanes are used, the resulting fused coatings are especially resistant to alkaline hydrolysis at elevated temperatures. The powder composition of the invention is particularly useful for electrostatic coatings. Preferably the powders are less than 74 microns in particle size (diameter) and generally are from 15 to 70, preferably 15 to 40 and most preferably 18 to 35 microns average diameter. The crosslinking agent, e.g., peroxide, serves to initiate crosslinking of the powder when it is fused, and it has been discovered by the present inventors and forms a facet of the invention, that it should be distributed as evenly as possible on each powder particle. It has been discovered that this can be achieved by sorbing the crosslinking agent, e.g., organic peroxide, into each of the individual porous polymer powder particles. The use of a porous powder allows more uniform distribution of the peroxide (and the silane if used) to give a greatly improved coating and as such is an important aspect of this invention. The presence of residual or grafted ethylenic unsaturation may aid in the crosslinking of the powders, and is optional.

The present compositions will generally contain 99.9 to 96.0 weight % polymeric powder, 0.05 to 2.0 weight percent organic peroxide and 0.05 to 2.0 weight percent organosilicon compound, preferably up to 1.0 weight percent each of the organic peroxide and then organosilicon compound and between 98 and 99.9 weight percent of the polymeric powder.

The organosilicon compound serves to improve the adhesion of the polymer to the glass or metal substrate. The organosilicon compound may not be necessary to develop or maintain adhesion, when the polymer itself has sufficient adhesive character, such as functionally grafted and random copolymers using such functional monomers as acrylic acid or glycidyl acrylate. Hence, compositions containing only powdered porous, organic polymeric material of these types and an organic peroxide with no silane present are contemplated, containing from about 99.95 to 98.0 weight percent polymeric material and 0.05 to 2.0 weight percent organic peroxide.

DRAWINGS

DETAILED DESCRIPTION OF THE INVENTION

Figure 1:
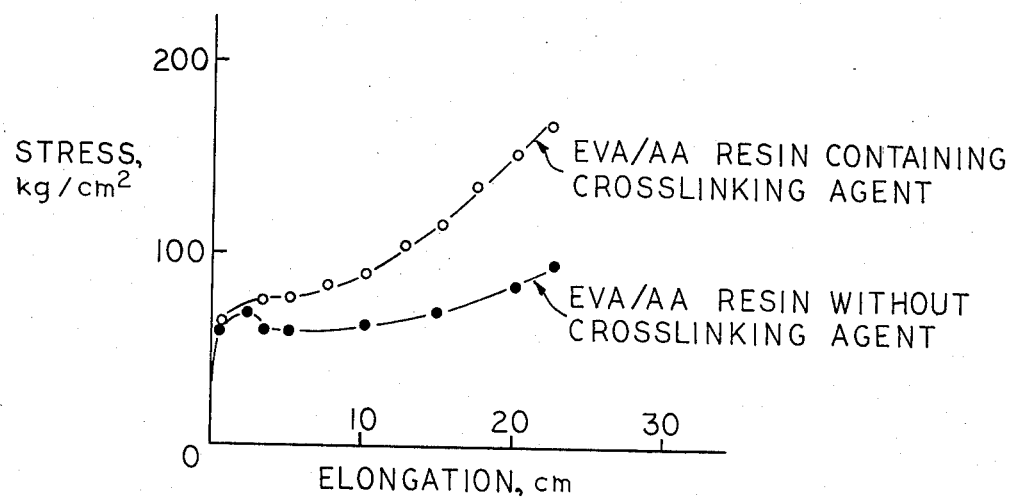
FIG. 1 is a graph comparing the stress-strain curves for crosslinking and uncrosslinked polymer coating.

In general the powders suitable for the practice of the present invention are prepared from polymers which include any normally solid synthetic organic polymeric thermoplastic resin whose decomposition point is somewhat higher than 100° C. Included are polyolefins, vinyls, olefin-vinyl copolymers, olefinallyl copolymers, polyamides, acrylics, polystyrene, cellulosics, polyesters, and polyhalocarbons such as fluorocarbons.

Generally the most suitable polyolefins for use in the present process include normally solid polymers of mono-alpha-olefins, which comprise from 2 to 6 carbon atoms, for example, polyethylene, polypropylene, polybutene, polyisobutylenes, poly (4-methylpentene-1), copolymers of these various alpha-olefins and the like.

Vinyl polymers suitable for use herein include polyvinyl chloride, polyvinyl acetate, vinyl choride/vinyl acetate copolymers, polyvinyl alcohol and polyvinyl acetal.

Among the suitable olefin-vinyl copolymers are ethylene-vinyl acetate, ethylene-vinyl propionate, ethylene vinyl isobutyrate, ethylene-vinyl alcohol, ethylene-methyl acrylate, and the like. Olefin-allyl copolymers include ethylene-allyl alcohol, ethylene allyl acetate, ethyleneallyl acetone, ethylene-allyl benzene, ethylene-allyl ether, and the like.

Examples of some specific acrylic polymers are poly(methyl methacrylate), poly(acrylonitrile), poly(methylacrylate) and poly(ethylmethacrylate). The polyamides suitable for use include polyhexamethylene adipamide, polyhexamethylene sebacamide, and polycaprolactam.

The process used to prepare the powders is suitable also for mixtures of thermoplastic polymers such as ethylene vinyl acetate/polyethylene, polyethylene/polypropylene, mixtures of copolymer such as ethylene vinyl acetate/ethylene-vinyl acetate terpolymer, and the like.

The powders may also be prepared from a solvent reaction system wherein the polymeric material is prepared in a solvent system, such as for example the alpha-olefin polymers, as described in numerous patents such as U.S. No. 3,112,300; U.S. No. 3,113,115; U.S. No. 3,197,452; Belgian Pat. No. 538,782 and British Pat. No. 994,416. Catalysts are the now well known "Ziegler" variety.

POLYMER CATALYSTS AND PROCESSES

The catalyst is normally prepared from a transition metal compound, preferably a halide, and a reducing component consisting normally of aluminum metal or a metal alkyl compound. Representative of the transition metal compounds used is a metal selected from Groups 4B, 5B, and 6B of the Periodic System.* Included in the preferred species are the titanium halides, for example, titanium tetrachloride, titanium trichloride, and titanium dichloride, and mixtures thereof. Other metal compounds such as zirconium tetrahalide and hafnium tetrachloride, vanadium chloride, chromium chloride, tungsten chloride, and the like, are especially useful. Still other transition metal halides containing halogens selected from the group consisting of bromine, iodine, chlorine, and in certain instances fluorine, can also be used.

*Handbook of Chemistry and Physics, The Chemical Rubber Co., Cleveland, Ohio, 45th Edition, 1964, p. B-2.

The reducing component of the catalyst composition may be any of a variety of reducing agents. Most common among the reducing agents are the organometallic compounds such as triethyl aluminum, aluminum diethyl chloride, aluminum ethyl dichloride, aluminum diethyl hydride, aluminum triisobutyl, aluminum triisopropyl, and related compounds. Many other reducing agents such as lithium aluminum hydride, zinc ethyl hydride, and the like are described in the literature as useful reducing agents and can also be used. These catalysts are all of the now well known "Ziegler" variety.

Certain Ziegler catalysts, or more particularly, certain modified Ziegler catalysts, have been found to be especially useful for polymerizing alpha-olefins. For example, a titanium trichloride catalyst modified with aluminum chloride having the formula, $TiCl_3.\frac{1}{3}AlCl_3$. Normally, this modified Ziegler catalyst is activated with a metal alkyl such as an aluminum alkyl, and preferably with an aluminum alkyl halide having the structural formula, $R_2AlX$ or $R_3Al_2X_3$, wherein R is selected from the group consisting of alkyl radicals containing 1 to 12 carbon atoms or phenyl or benzyl radicals, and X is a halogen atom selected from the group consisting of chlorine, bromine or iodine.

A variety of monomers may be polymerized with the Ziegler type catalysts. Any unsaturated hydrocarbon corresponding to the general formula $R-CH=CH_2$, wherein R is selected from the group consisting of an alkyl radical having from one to six carbon atoms, a phenyl radical, or a alkyl substituted phenyl radical can be used. Examples of specific unsaturated hydrocarbons which can be polymerized include alpha-olefins containing 3 to 8 carbon atoms, such as propylene, butene, isobutylene, pentene, isoamylene, hexene, isohexenes, heptene, isoheptenes, octene, isooctenes, and the like.

The preferred catalyst composition for the polymerization of propylene comprises a modified titanium trichloride having the structural formula, $TiCl_3.\frac{1}{3}AlCl_3$, activated with diethyl aluminum chloride. Ratios of diethyl aluminum chloride and titanium trichloride of between 0.3:1 and 6:1 may be advantageously used. The presence of an alkali metal halide in an amount of between 0.5 to 10 mols of an alkali metal halide per mol of reduced titanium tetrahalide, and preferably a mol ratio of from 0.8 to 5 mols of an alkali metal halide, such as sodium chloride, per mol of reduced titanium tetrahalide can be used for improving catalyst activity.

The monomers may be polymerized at moderate temperatures and pressures with the Ziegler type catalysts described above, generally at temperatures of 0° C. to 150° C., with temperatures on the order of 25° C. to 80° C. being particularly useful. A solvent such as a paraffin or cycloparafin having 3 to 12 carbon atoms, may be employed for the polymerizations, however, the olefin monomer is frequently used for this purpose. The polymerizations are preferably conducted under conditions that exclude atmospheric impurities such as moisture, oxygen and the like.

The pressure ranges from about atmospheric pressure to about several atmospheres with pressures in excess of about 500 p.s.i. rarely being employed.

After the polymer has been produced, the catalyst is deactivated by contacting the polymeric reaction mixture with a material which reacts with and deactivates the catalyst. Such materials include, for example, lower alcohols, acetone and water.

The term polyolefins includes those materials modified with materials such as the unsaturated organic acids, for example, maleic acid, muconic acid, dimethyl muconic acid, acrylic acid, methacrylic acid, vinyl acetic acid, and the like. Generally the polyolefins may be modified by from 1 to 10 weight percent of the unsaturated acid. The modification has been observed to improve the surface adhering characteristics of the polyolefin polymers when they are employed as surface coating, particularly the alpha-olefins, such as polypropylene. The modifying unsaturated acids may be incorporated into the polyolefins by intimately contacting the modifier with the polyolefin in a melt or solution of the polymer in the presence of a free radical source, such as an organic peroxide. The modifying unsaturated acid may also be randomly copolymerized with a polymerizable olefin, such as ethylene, and neutralized or partially neutralized to yield an ionomer.

In the process of preparing powders for the present invention it is possible to employ graft polymers prepared by known methods in the art, e.g., those to be found in U.S. Pat. Nos. 3,177,269; 3,177,270; 3,270,090; 3,830,888; 3,862,265; British Pat. No. 1,217,231; British Pat. No. 679,562 and the like.

The preferred modifying monomers which are grafted to the backbone or copolymerized with ethylene are $C_3$ to $C_{10}$, preferably $C_3$ to $C_6$ unsaturated mono- and polycarboxylic-containing unsaturated acids with preferably at least one olefinic unsaturation, anhydrides, salts, esters, ethers, amides, nitriles, thio, glycidyl, cyano, hydroxy, glycol, and other substituted derivatives thereof.

Examples of such acids, anhydrides and derivatives thereof include maleic acid, fumaric acid, itaconic acid, citraconic acid, acrylic acid, glycidyl acrylate, cyano ethyl acrylate, hydroxyethyl methacrylate, acrylic polyethers, acrylic anhydride, methacrylic acid, crotonic acid, isocrotonic acid, mesaconic acid, angelic acid, maleic anhydride, itaconic anhydride, citraconic anhydride, sodium acrylate, calcium acrylate, magnesium acrylate and the like.

Other monomers which can be used either by themselves or in combination with one or more of the carboxic acids or derivatives thereof include $C_8$ to $C_{50}$ vinyl monomers such as monovinyl aromatic compounds, i.e. styrene, chlorostyrenes, bromostyrenes, alpha-methyl styrene and the like.

Other monomers which can be used are $C_8$ to $C_{50}$ vinyl esters and allyl esters, such as vinyl butyrate, vinyl laurate, vinyl stearate, vinyl adipate and the like, monomers having two or more vinyl groups, such as divinyl benzene, ethylene dimethacrylate, triallyl phosphite, dialkylcyanurate and triallyl cyanurate.

The present invention is especially useful for grafted polymers prepared by grafting a polymer of a $C_2$ to $C_8$ mono-α-olefin or its copolymers with acrylic acid in a special process. The polymers of $C_2$ to $C_8$ mono-α-olefins are commonly referred to as polyolefins and for the purpose of this invention are to include copolymers of the $C_2$ to $C_8$ mono-alpha-olefins with each other and with other monomers as well as the homopolymers.

Polymers containing diolefins such as butadiene and isoprene are also suitable. The polyolefins are produced utilizing in most instances a Ziegler-type catalyst, but can also be Phillips catalysts and high pressure technology.

Examples of suitable polyolefins, both plastic and elastomeric, include low or high density polyethylene, polypropylene, polybutene-1, poly-3-methylbutene-1, poly-4-methylpentene-1, copolymers of monoolefins with other olefins (mono-or diolefins) or vinyl monomers such as ethylene-propylene copolymers or with one or more additional monomers, i.e. EPDM, ethylene/butylene copolymer, ethylene/vinyl acetate copolymer, ethylene/ethyl acrylate copolymer, propylene/4-methylpentene-1 copolymer and the like.

The term "copolymer" includes two or more monomer constituents and substituted derivatives thereof.

The preferred grafted polyolefins employed in the present invention contain propylene and/or ethylene, i.e. polypropylene and polyethylene. The starting polymer used as a base material in the graft process will preferably have a melt index (MI) ASTM D-1238-65T of 1 to 40, preferably 15 to 40, and most preferably 20 to 30, or melt flow rate (MFR) between about 0.1 to 50 and preferably 0.5 to 10, most preferably 2 to 5. These melt flow rates correspond approximately to viscosity average molecular weights of about 100,000 to 500,000.

The preferred monomers to be grafted to the $C_2$ to $C_8$ polyolefin and other polymers for use in the present invention are maleic anhydride, acrylic acid, methacrylic acid, glycidyl acrylate, hydroxyethyl methacrylate and their derivatives. Others that can be used are described elsewhere herein. However, other monomers may be added in admixture with these such as maleic anhydride (MA), styrene, acid esters, salts and the like to form graft copolymers. MA and styrene and MA and acrylic acid are preferred over MA alone when polymer grafts of MA are desired.

The grafting reaction is initiated by a free-radical initiator which is preferably an organic peroxygen compound. Especially preferred peroxides are t-butyl per benzoate, dicumyl peroxide, 2,5-dimethyl-2,5-di-tert-butylperoxy-3 hexyne (Lupersol 130), alpha, alpha'-bis (tert-butylperoxy) diisopropyl benzene (VulCup R or Percadox 14) or any free radical initiator having a 10-hour half-life temperature over 80° C. or mixtures thereof. Generally, the higher the decomposition temperature of the peroxygen compound, the better. See pp 66–67 of *Modern Plastics*, November 1971, which is incorporated hereby by reference, for a more complete list of such compounds.

The free radical initiator is used in amounts corresponding to 0.005 to 5, preferably 0.02 to 2, most preferably 0.02 to 1.0 weight percent based on monomer. When based on polymer, free radical initiator is used in amounts of 0.0001 to 1, preferably 0.001, and most preferably 0.001 to 0.5 weight percent.

The monomer to be graft polymerized is used in amounts of 0.01 to 100, preferably 0.05 and 50, and most preferably 0.1 to 25 weight percent of the base polymer.

Generally, the monomer and initiator are blended together and added simultaneously, except in the situation of a polyethylene or ethylene predominant copolymer. Illustrative of the graft preparation is the grafting of acrylic acid onto polypropylene. Molten polypropylene is contacted with acrylic acid at 350° to 650° F., preferably 400° to 550° F. in the presence of a peroxide initiator. The initiator and acrylic acid are added as a liquid blend. The resulting graft copolymers have been appreciably degraded and changed in molecular weight as compared to the base polymer.

The powder is preferably prepared from the polyolefin by dissolving the polymer in a solvent, cooling the solution to precipitate the polymer and drying the resulting slurry by atomization as described in copending application U.S. Ser. No. 602,211, filed Aug. 6, 1975 and now U.S. Pat. No. 4,012,461 of Robert A. van Brederode, hereby incorporated by reference in its entirety. The porous powder that results allows for better distribution of additives. As a result, a product with more uniform crosslinking and adhesion is produced. This can result in significantly better mechanical properties of the film coating and better adhesion. Other powder making techniques such as grinding and emulsification produce non-porous powder which has the following disadvantages among others: the additives would cover the surface only and do not penetrate into the polymer; the additives which have been melt mixed prior to powder making to incorporate them into the polymer may be rendered inactive by high temperatures used in emulsification of the mix; grinding of such melt mixed polymer and additives is not economically or technically suitable for producing the necessary fine powder particles.

The solvents employed in the preferred powder making technique are preferably paraffins or cycloparaffins having 5 to 12 carbon atoms. Suitable solvents include n-pentane, isoprene, n-heptane, isooctane, cyclohexane, methylcyclohexane, nonane, and the like or mixtures of solvents. The solvent will generally contain from about 1 to 40 weight percent, more preferably about 5 to 20 weight percent of polymer based on the total weight of the solution.

About 15 weight percent of the polymer is dissolved in the solvent, for example n-heptane, by heating at 100° to 140° C. preferably in the range of 110° to 130° C. under autogenous pressure for 5 minutes to 2 or more hours, typically about 1 hour. Preferably the temperature is selected to maintain the pressure in the autoclave at less than 75 psig more preferably less than 50 psig. Both ethylene and propylene based polymers dissolve under these conditions.

The slurry is produced by cooling the solution to a temperature below 90° C. Polymer precipitation begins at about 90° C. and continues as the temperature is lowered, at a rate of 1 to 10 C°/minute preferably about 5 C°/minute.

The temperature of the solution is lowered to about 50° C. Lower temperatures may be used but are not necessary, similarly temperatures from 20° C. up to about 80° C. are suitable for the final slurry temperature. It is readily apparent that at temperatures above 20° C., somewhat larger amounts of polymer will remain dissolved in the solvent, unless long precipitation periods are provided. In any event it is necessary to keep the residual polymer, which is dissolved in solution, below the concentration which will produce strings as the solvent is atomized along with slurry particles.

Thus since it is desirable to remove solvent from the slurry particles, operation of the process should be carried out such that there is less than that amount of the polymer remaining in solution in the solvent than will inhibit formation of droplets at the drying zone temperature. The amount of polymer which may remain in solution in a solvent which has a vapor pressure of 50 to 400 mm of mercury at the temperature of the drying zone is that amount which produces a viscosity in the solvent of no greater than 5 centipoise at the temperature of atomization. The particular lower or final precipitation temperature will have to be determined for each solvent and polymer employed to achieve this result. This can be experimentally determined or may be available in standard technical and engineering tables in regard to some combinations. Lengthened precipitation periods may also be used to remove larger amounts of polymer from solution at a given temperature.

The cooling and precipitation is conducted in an agitated solution. This aids cooling and speeds precipitation. However, the nature of the agitation is quite critical. The prior art believed that shearing of solution encouraged the formation of polymer strings and thus sought to avoid all agitation to prevent this undersirable result. However, surprisingly it has been found that high shear does not result in strings.

The precipitation may be carried out in a vessel which is fully baffled. Turbine agitators, typically ⅓ to ⅔ the diameter of the vessel have been used, operated with good results at from 20 to 300 rpm. Satisfactory high shear agitation can be obtained with paddle diameter of from 30 to 80 percent of the internal diameter of the vessel.

The power used to rotate the turbine shaft is typically 4 to 10 horse power per 1,000 gallons of material to be agitated. This is qualitatively defined as "intense" agitation. The shear is high, due both to the intense agitation and the turbine impellers which exhibit intense shear. Thus the problem observed in the prior art attributing the production of polymer strings to shearing, is overcome by intensifying the degree of shear to a very high degree, short of emulsification.

The terms defining agitation and shear are qualitative but nonetheless, do provide those of skill in the art with information to carry out the process when coupled with the conditions of operation. The optimum results of the present process are obtained at 250 to 300 rpm.

The degree of shearing necessary to carry out the process is less than that which would be achieved if an emulsion were produced. An emulsion of the precipitated polymer is not necessary but it is possible. Thus the present shearing may be described as less than that necessary to produce an emulsion of polymer particles in the solvent, but by conventional chemical engineering practice the agitation is intense as measured by energy input per unit volume of liquid.

The precipitated particles form a slurry in the precipitation vessel. This slurry is removed (by gravity, pumping, pressure, screw, etc.) and atomized through a conventional nozzle or centrifugal atomizing wheel such as a provided by Niro Atomizer, Ltd. into a vaporization zone, into which a drying gas is being fed at a temperature of 80° to 160° C., depending on the polymer and solvent, to produce powder particles leaving the vaporization zone at temperatures generally in the range of 30° to 50° C. and having about 5 to 30 weight percent solvent still associated therewith. The damp powder is then dried to the desired condition, for example by fluidized bed, vibrating tray, tumbling or the like.

The vaporizing gas may be air, however, explosive mixtures may result with the powder or solvent. Preferably inert gases such as nitrogen, $CO_2$, or helium are employed.

Generally the particles produced according to this method have a size of less than 100 microns, usually over 99% of the particles are less than 75 microns.

Some powder, for example, propylene resins (polypropylene, ethylene propylene copolymers, blends of propylenes with ethylene propylene rubber and high density polyethylene and acrylic acid grafted modifications thereof having melt flow rates of 2 to 80) tend to be made of 20 to 30% agglomerates as taken from the vaporization zone, with the remainder being less than 100 microns, e.g., less than 74 microns; the average size being about 30 microns. Other powders, for example ethylene resins (polyethylene, ethylene-vinylacetate) tend to form fewer agglomerates as taken from the vaporization zone.

The agglomerates are readily reduced to finer powder by attrition, for example, by impingement mill (particle on particle) or pin mill, such that the yield of particles of less than 100 microns approaches 99% or more. The milled agglomate particles are porous and irregularly spherical, but not sharply angular or elongated as with grinding.

The usual particle size in the absence of agglomeration is less than 100 microns, however, the powders are usually classified to remove any oversized particles, e.g., agglomerates, scale, trash etc. and to separate the powders for different uses.

While peroxides and optionally silanes are the primary additives, it has also been found that other additives such as stabilizer, antioxidants, coloring agents and the like may conveniently be added to the solution of polymer, before or during precipitation and slurry stages or during or after the drying step. Soluble or dispersable additives are very evenly distributed throughout the powders.

The organic peroxide is a free radical initiator which causes or accelerates the crosslinking when the ethylene polymer powder is fused, for example, to a substrate. Suitable organic peroxides include benzoyl peroxide, dicumyl peroxide, di-t-butyl peroxide, 2,5-dimethyl-2,5 di(t-butyl peroxy) hexane, di-ethyl peroxide, acetyl peroxide, and the like. The peroxide should be selected with care to avoid those which are explosive under the conditions of preparation, storage or use of the powders, and those subject to explosion by shock. 2,5-dimethyl-,5-di(t-butyl peroxy) hexane has been found to be easily applied to the powder, dried thereon and apparently is not particularly hazardous in the compositions of the present invention. The peroxide may be added to the precipitated polymer slurry or preferably to the partially dried powder as a liquid. It is advantageous to add the peroxide diluted with solvent while the powder is still somewhat damp to provide better dispersion into the powder pores. Alternately the peroxide may be added to the completely dry powder in a separate operation providing sufficient dispersion of the peroxide is achieved such as by diluting the peroxide with a solvent that will wet the polymer and penetrate the porous structure.

The organosilicon compounds are frequent called "silanes". The silanes may have one to four organic radicals attached to silicon. In particular one or more organic radical terminates with a vinyl, amine, methacrylate, epoxy or chloropropyl group which may react with available reactive groups of the polymer powder. Silanes having vinyl functionality are particularly preferred in conjunction with a peroxide when the polymer contains no available reactive groups such as polyethylene, vinyl acetate copolymer or polypropylene.

Compositions of the present invention can be used to form superior coatings for glass bottles in providing protection and safety and adhering to the bottles when cleansed and caustic rinsed.

In addition to the essential components of the present composition other conventional materials may be added thereto, such as fumed silica or talc to improve flow characteristics.

The ethylene compositions of the present invention are crosslinked by heating at a temperature of 150° to 250° C. for a sufficient time, generally 0.5 to 5 minutes to obtain the desired degree of crosslinking. The crosslinking may be accelerated by using more peroxide or even small amounts of accelerators, such as N, N-dimethylaniline.

In this specification the description and listing of materials in regard to one aspect or embodiment of the invention herein is also intended to apply to other aspects or embodiments wherein these materials may be generically setforth.

EXAMPLE 1-4

In these examples acrylic acid modified (about 4% acrylic acid by weight) polyethylene, polypropylene and EVA were dissolved in heptane under autogenous pressure at about 120° C. and cooled to about 55° C. under conditions of high shear agitation.

The slurry was sprayed through a Niro centrifugal atomizer having the drying gas entering the spray chamber through a dispenser concentric about the atomization wheel through which the slurry is atomized. Spherical particles of which 99% were smaller than 75 microns were recovered with attrition of the agglomerates. The conditions of atomizing and the spray chamber are set out in Table I below.

The process was also applied to ethylene vinyl acetate copolymer, ethylene vinyl acetate-acrylic acid copolymer, polyethylene, and polyethyleneethylenevinyl acetate-acrylic acid terpolymer. The process is also applicable to non grafted polypropylene. Each polymer was generally employed as described above and materials were produced in the MI range of from 0.5 to 40 with 99+% of the powder of less than 74 microns and the weight average particle size of about 20 microns as collected from the spray drier and attrited to remove agglomerates. The powders did not require any dusting powders, such as fumed silica for handling however, these may be added if desired. The powders remained handleable after packing. Bulk density was about 0.45 grams/cc for the ethylene polymers and 0.3 grams/cc for the propylene resins.

Polyethylene modified with 0.28% himic anhydride graft was also prepared in fine powder form as well as a polyethylene-0.29% himic anhydride graft that had been esterified with a glycol ester and polyethylene-2% glycidyl acrylate copolymer (all percents herein are by weight unless otherwise indicated).

EXAMPLES 5-8

In these examples polymer powders (20-25 micron weight average size) of a ethylene/vinyl acetate copolymer containing 5.9% vinyl acetate and modified with 0.5% acrylic acid was prepared according to the procedure of Examples 1-4 and impregnated using methanol as a carrier with varying amounts of 2,5-dimethyl 2,5- di(t-butyl peroxy) hexane. The molded properties were evaluated using 10 mil compression molded pads heated for a total of 4 minutes at the temperature specified in TABLE II according to ASTM D-412. In addition to the improved mechanical properties, the maximum useful temperature before the polymer flows out is increased for a primary crosslinked resin above that of the non-crosslinked polymer.

The improvement in toughness is vividly demonstrated in FIG. 1, where the stress/strain curve for a cross-linked EVA/AA resin is compared to that same resin without peroxide.

plied to glass were evaluated to determine the adhesion of the various coatings to a glass substrate in different environments. The tests samples were prepared using ethylene vinyl acetate copolymer containing 5.9 percent vinyl acetate and modified with 4% acrylic acid. A solution of 2, 5-dimethyl 2,5-di (t-butyl peroxy) hexane to provide 0.2% peroxide as a crosslinking agent necessary to obtain a tough polymer film was applied to 20–25 micron polymer powder and several silanes were evaluated at 0.1 and 1.0% concentrations. The powder was pressed onto one side of clean glass slides and heated to 375° F. (190° C.) for 3 minutes to provide 4 to

TABLE I

| | Slurry | | | Drying Gas (Nitrogen) | | | | |
|---|---|---|---|---|---|---|---|---|
| Example | Type | Feed Rate | Temp. °C. | Rate cfm | Inlet Temp. °C. | Outlet Temp. °C. | Powder Volatiles % | Product Powder Kg/hr |
| 1 | 11% (polyethylene modified with ~4% acrylic acid) in heptane | 1 lb/min | 55 | 40 | 120 | 40 | 6 | 1.8 |
| 2 | 18% [ethylene vinyl acetate 5.6% vinyl Acetate) modified with ~4% acrylic acid] in heptane | 0.5 lb/min | 55 | 40 | 130 | 40 | 1 | 3.4 |
| 3 | 9% (polypropylene modified with ~6% acrylic acid) in heptane | 1.5 lb/min | 55 | 40 | 120 | 45 | 20 | 2.2 |
| 4 | 9% (ethylene/vinyl acetate [5.6 vinyl acetate] (MI 25) in heptane | 0.5 lb/min | 55 | 40 | 130 | 40 | 5.5 | 1.8* |

*99 + % finer than 74 microns without attrition

TABLE II

| | WEIGHT PERCENT | | MECHANICAL PROPERTIES* @ BREAK | |
|---|---|---|---|---|
| EXAMPLE | PEROXIDE % (by addition) | MOLDING TEMP. °F. | TENSILE STRENGTH (kg/cm$^2$) | ELONGATION % |
| 5 | 0 | 400 | 94.2 ± 3.5 | 719 ± 57 |
| 6 | 0.25 | 400 | 144.3 ± 4 | 818 ± 32 |
| | | 375 | 154.6 ± 7.2 | 818 ± 25 |
| | | 325 | 114.8 ± 6 | 677 ± 17 |
| 7 | 0.5 | 400 | 136.5 ± 10.8 | 608 ± 17 |
| | | 375 | 170.6 ± 16.2 | 749 ± 68 |
| | | 325 | 126 ± 6.9 (no break) | >733 |
| 8 | 1.0 | 400 | 138.3 ± 8.7 | 535 ± 110 |
| | | 375 | 141.9 ± 22.6 | 438 ± 103 |
| | | 325 | 127 ± 3.2 (no break) | >733 |

*Measured on 10 mil compression molded pads heated for a total of 4 minutes in a press at the specified temperature according to ASTM D-412.

EXAMPLES 9, 10 & 11

In these examples crosslinkable powders (20–25 micron weight average particle size) of ethylene vinyl acetate copolymer containing 5.9% vinyl acetate and modified with acrylic acid were coated on to glass bottles (preheated to 400° F.) and fused in an oven at 400° F. The bottles were subjected to a fragment containment test. The coated bottle is filled to 95% full with a dilute solution of sulfuric acid and sodium bicarbonate. The bottle, which develops an internal pressure of 60 psig at 70° F., is dropped from four feet onto a bulls eye. The weight percent of glass fragments passing a 3 foot diameter circle is determined. A good coating is one that retains 95 to 100% of the glass fragments within this circle and has a scatter index less than 2 ounce.feet. The coatings and results are set out in TABLE III.

EXAMPLES 12–18

In these examples the powder compositions contain peroxide and silane. The adhesion of the coatings ap- 5 mil coatings. This left the sides of the coating open to penetration of the various solutions. The coated slides were placed into the various solutions. Failure was determined by examining the coating every hour until the coating could be pulled from the slide without appreciable resistance. The slides were aged at room temperature for one week before testing. The results of the tests are given below in TABLE IV.

Figure 2:
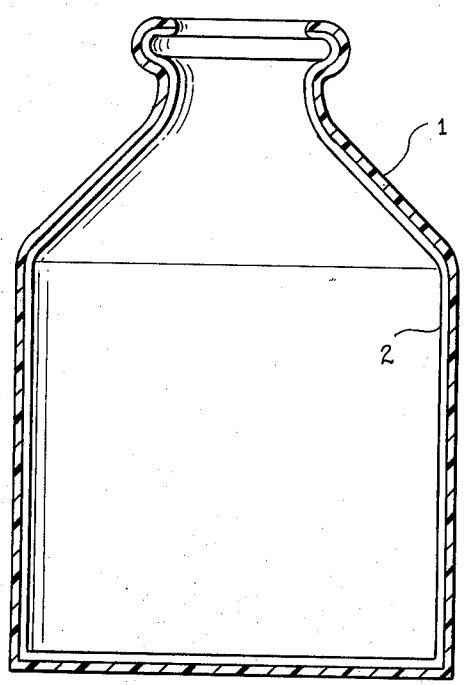
FIG. 2 is a laminate of glass and a crosslinked polymer powder according to the present invention.

In FIG. 2 a glass bottle 2 is shown with a continuous coating of a crosslinked coating 1 from the powder of the present invention forming a novel laminate.

The mechanical properties of the peroxide crosslinked resin are not reduced by the presence of the silane. A tensile strength of 134.4±14.7 kg/cm$^2$ and an elongation of 353±87 percent was obtained on a sample molded at 375° F. similar to example 8 which was molded at the same temperature. All examples herein are actual.

TABLE III

| EXAMPLE | PEROXIDE* | Weight Percent ACRYLIC** ACID | VINYL ACETATE | COATING THICKNESS MILS | PERCENT RETENTION OF GLASS FRAGMENTS | SCATTER INDEX*** OUNCE · FT |
|---|---|---|---|---|---|---|
| 9 | 0 | 0.5 | 6 | 5.9 ± 0.9 | 72.4 | 16.1 |
|   | 0 | 0.5 | 6 | 8.8 ± 1.4 | 65.4 | 18.1 |
| 10 | 0.5 | 0 | 6 | 6.6 | 99.9 | 0.33 |
| 11 | 0.5 | 4.0 | 6 | 5.5 | 98.4 | 1.35 |

*2,5-dimethyl- 2,5-di(t-butyl peroxy) hexane.
**grafted to 6 percent ethylene vinyl acetate resin.
***weight of glass times distance the glass traveled from the bullseye for glass fragments.

TABLE IV

| TESTS Solution | EX. 12 Control No Silane | EX. 13 Amino functional Silane[1] | | EX. 14 Amino functional Silane[2] | | EX. 15 Vinyl functional Silane[3] | | EX. 16 Methacrylate functional Silane[5] | EX. 17 Epoxy functional Silane[6] | EX. 18 Chloropropyl functional Silane[7] |
|---|---|---|---|---|---|---|---|---|---|---|
| | | 0.1 wt % | 1.0 wt % | 0.1 wt % | 1.0 wt % | 0.1 wt % | 1.0 wt % | | | |
| 1.0 N NaOH (pH 14) | 1 hr | 6 hrs | 4 hrs | 1 hr | 1 hr | 7 to 20 hr | 20 hr | 8 hrs | 5 to 7 hrs | 5 hrs |
| Distilled Water 80° C. | 1 hr | 24 hrs | 24 hrs | 24 | 24 | over 400 hrs | | — | — | — |
| Distilled Water 23° C. | 1 hr | over 500 hrs | — | — | — | — | | — | — | — |

[1] Dow Corning Z-6020, $(CH_3O)_3 Si(CH_2)_3 NHCH_2 CH_2NH_2$
[2] Dow Corning Z-6020

[3] Dow Corning QZ8-5069, 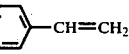

[4] 0.12 parts per hundred polymer additional peroxide added.
[5] Dow Corning Z-6031
[6] Dow Corning Z-6040 

[7] Dow Corning Z-6076 $(CH_3O)_3 Si(CH_2)_3Cl$

The foregoing comprises a detailed description of a complex invention having many important facets and features. It is useful to summarize at this point the major features which form elements of the invention.

Although the invention has been described in particularity with respect to an organic peroxide and its crosslinking effect on crosslinkable polyolefins, the same approach can be used for materials that are normally considered not to be crosslinkable such as polypropylene. In the case of polypropylene, one uses a multi-functional crosslinking agent, such as bismaleimides.

The invention utilizing the peroxide crosslinking agent is especially preferably utilized with polyethylene, copolymers of polyethylene such as ethylene/vinyl acetate, ethylene/acrylic acid, which copolymers can be either random copolymers or grafted copolymers. In addition, the technique is especially preferably utilized with ionomeric polymers such as those sold by duPont under the trademark of Surlyn. These are copolymers of ethylene and methacrylic acid whereby a portion of the acid component in the polymer has been neutralized with a base to form a cationic positively charged derivative of the acid groups such as sodium ion substituents or ammonium ion substituents.

There are several subtle, but important, interrelationships based on the presence of certain functional monomers in a grafted or random copolymer, if one utilizes it, such as the preferred acrylic acid grafted polyethylene or the preferred methacrylic acid copolymer which has been partially neutralized to form an ionomer.

These relationships constitute important features of the invention and are summarized as follows:

Silane components having a vinyl unsaturated functionality will improve the adhesion to substrates of any polymer in which the vinyl group will be incorporated by the action of the free radical, e.g., peroxide initiator. In such instances, presence of other functional monomers, such as acrylic acid, is not absolutely necessary for adhesion.

However, if an acrylic acid functionality either grafted or random, or other functionality of similar nature is present in the polymer, then it will be synergistic with the vinyl silane to a large extent and will also be synergistic to a somewhat lesser extent with other silanes having functionality which are capable of reacting with the functionality in the polymer backbone, such as epoxy, amino, etc.

Silanes having a functionality other than vinyl functionality which are incapable of reacting with a polymer containing no functionality, are not capable of imparting improvement to the base polymer. When the base polymer has no functionality, the only silane capable of improving the adhesive properties of the coating resulting from the fusion of the powder is a silane having vinyl functionality which will be incorporated into the polymeric backbone via the action of the free radical initiator, e.g. the peroxide in the case of most polymers, but in some instances a multi-functional material such as bismalemide.

Silanes containing both vinyl functionality and another functionality capable of interacting with functional substituents in a polymer such as acrylic grafted polyethylene show maximum adhesion synergy and maximum resistance to base hydrolysis synergy. It is possible for the vinyl functionality to be incorporated in the backbone through the action of the free radical initiator and it is possible for the non-functionality in the vinyl silane to interact with the existing functionality in the polymer backbone so that silane monomers are attached to the polymer both through the vinyl functionality and the other non-vinyl functionality in that silane.

A good example of such a silane fitting the last class is Dow Corning QZ8-5069 which was used in Example 15.

Examples of silanes commercially available that can be used in this invention are listed below.

| Chemical name | Chemical formula |
|---|---|
| Vinyltriethoxysilane | $CH_2=CHSi(OC_2H_5)_3$ |
| Vinyl-tris:beta-methoxy-ethoxy)silane | $CH_2=CHSi(OCH_2CH_2OCH_3)_3$ |
| gamma-Methacryloxypropyltrimethoxysilane | $CH_2=C(CH_3)-C(O)-O(CH_2)_3Si(OCH_3)_3$ |
| beta-(3,4 Epoxycylohexyl)-ethyltrimethoxysilane | (epoxycyclohexyl)-$CH_2CH_2Si(OCH_3)_3$ |
| gamma-Glycidoxypropyl-trimethoxysilane | $CH_2-CH-CH_2-O(CH_2)_3Si(OCH_3)_3$ (with epoxide O) |
| gamma-Aminopropyltri-ethoxysilane | $NH_2CH_2CH_2CH_2Si(OC_2H_5)_3$ |
| n-beta-(Aminoethyl)-gamma-aminopropyl-trimethoxysilane | $NH_2CH_2CH_2NH(CH_2)_3Si(OCH_3)_3$ |
| gamma-Chloropropyltri-methoxysilane | $ClCH_2CH_2CH_2Si(OCH_3)_3$ |
| gamma-Mercaptopropyl-trimethoxysilane | $HSCH_2CH_2CH_2Si(OCH_3)_3$ |
| beta-Mercaptoethyl-triethoxysilane | $HSCH_2CH_2Si(OC_2H_5)_3$ |

It is also to be emphasized that the use of other additives in the porous interstices of each porous particle is contemplated. Therefore, in addition to peroxides, silanes and multi-functional crosslinking materials, it is also contemplated that one or all standard polymer additives can be used.

These include stabilizers, colorants, plasticizers, pigments, finely divided solid fillers, catalysts, foaming agents, antistats, flame retardants, lubricants, etc.

Moreover, a unique application of the porous powder particles of the invention is to utilize them as a carrier medium whereby a concentrate of a particular additive, for instance peroxide, is sorbed on the powder particle.

The activated powder particle is then used as a concentrate to be blended with other powder particles which do not have that additive.

Moreover, the powders of the invention can be beneficially blended with other powders known to be useful for powder coatings such as nylon powder, epoxy powders, vinyl powders, chlorinated polyolefin powders, cellulose acetate butyrate powders, polyester powders, acrylic powders, etc.

For instance, a typical blend would comprise 40 to 60 wt. % of the porous powder of the invention with:
(a) 60–40% ionomer powder or (b) 60–40% nylon powder or (c) 60–40% epoxy powder Although the powder compositions of the invention are capable of being used per se or mixed with other powders as the sole continuous fused surface coating on substrates, such as glass bottles, they can also be used as a component of a coating system which has two or more different layers.

The coating resulting from the inventive powder compositions can either be that coating adhered directly to the primary substrate or a top coating placed over an already existing coating.

It should be noted that powders such as polyester powders, which are intended to be crosslinked by peroxide free radical crosslinking agents, are a particularly suitable combination with the powder compositions of the invention.

Inspection of scanning electron micrographs clearly reveals the porosity of the preferred porous powders particles of this invention. The porosity consists of a multiplicity of micro channels indicated by many holes in the surface of each powder particle. Such holes have an estimated diameter of 0.5 to 5 microns.

Particle size determinations expressed herein are measured by volume displacement a well known technique in the art. Details can be found in Section VII, Theory of Operation of the operators manual for the Coulter Counter Model T A II and is hereby incorporated by reference in its entirety.

It is also contemplated as part of the invention that porous powders of functional polymers can be used with silanes which have a functionality that will react with that of the polymer functionality. In such a situation free radical initiators can be omitted for many end use applications where the crosslinking contribution of the initiator is not required.

The porous powders of this invention are also suitable for use as carriers for solid inks in electrostatic copies.

The silane containing powders of this invention are normally applied to a heated substrate. If, as taught by the prior art, a silane is applied separately to a substrate which is then preheated before the powder is applied, vaporization or degradation of the silane or both with likely occur. The technique of the invention avoids this disadvantage because the total exposure to heat is minimal.

To reduce the cost of a powder coating the porous powder composition of this invention containing peroxide, polymer and silane may be used as a thin primer coat to adhere to the substrate. A top coat formed from the powders described herein except that they require no silane component would then be applied to the primer coat of the powders of this invention. Especially preferred top coats would be crosslinked ethylene/vinyl acetate polymer or polyethylene. In addition, nylon is another especially preferred top coat which does not require crosslinking and would be compatible with the primers described especially if they contain a functional monomer such as acrylic acid or glycidyl acrylate. The rationale for utilizing the top coat is to eliminate the use of silane which is an expensive component yet provide a tough outer layer.

The invention claimed is:
1. A crosslinkable powder comprising a major amount of porous polymeric particles of an organic, thermoplastic polymer said polymer particles being less than 100 microns in size and having a decomposition point higher than 100° C., having sorbed into each of the porous polymer particles a minor amount of an organic peroxide and a minor amount of an organosilicon compound.

2. The crosslinkable powder according to claim 1 wherein said organosilicon compound contains a vinyl, amine, methacrylate, epoxy or chloropropyl terminal group.

3. The crosslinkable powder according to claim 1 containing 99.9 to 96.0 weight % polymeric material, 0.05 to 2.0 weight % organic peroxide and 0.05 to 2.0 weight % organosilicon.

4. The crosslinkable powder according to claim 3 wherein said polymer powder is less than 74 microns in particle size.

5. The crosslinkable powder according to claim 1 wherein said polymeric material comprises a polyolefin modified with an unsaturated organic acid grafted thereon.

6. The crosslinkable powder according to claim 1 wherein said polymeric material comprises a polyolefin modified with glycidyl acrylate grafted thereon.

7. The crosslinkable powder according to claim 5 wherein said polyolefin is ethylene-vinyl acetate copolymer modified with acrylic acid grafted thereon.

8. The crosslinkable powder according to claim 1 wherein said polyolefin is a random copolymer of ethylene and unsaturated organic acid or a neutralized or partially neutralized random copolymer.

9. The crosslinkable powder according to claim 5 wherein said polyolefin is polyethylene modified with acrylic acid grafted thereon.

10. The crosslinkable powder according to claim 1 wherein said peroxide is 2, 5-dimethyl -2, 5-di(t-butyl peroxy) hexane.

11. The crosslinkable powder according to claim 2 containing 96 to 99.9 weight percent of a plyolefin which is ethylene-vinyl acetate copolymer modified with acrylic acid grafted thereon.

12. The crosslinkable powder according to claim 1 wherein said polymeric material comprises a polymer of ethylene.

13. The crosslinkable powder according to claim 1 wherein said polymeric material comprises ethylenevinyl acetate copolymer.

14. The crosslinkable powder according to claim 12 wherein said organosilicon has a terminal vinyl group.

15. The crosslinkable powder according to claim 13 wherein said organosilicon has a terminal vinyl group.

16. A crosslinkable powder comprising a major amount of porous polymeric particles of an organic thermoplastic polymer said polymer particles being less than 100 microns in size and having a decomposition point higher than 100° C. and having sorbed into each of the porous polymer particles a minor amount of an organic peroxide.

17. The crosslinkable powder according to claim 16 wherein said polymeric material comprises a polyolefin.

18. The crosslinkable powder according to claim 6 wherein said polymeric material comprises a polyolefin modified with an unsaturated organic acid or glycidyl acrylate grafted thereon.

19. The crosslinkable powder according to claim 16 wherein said polymeric material comprises a random copolymer of unsaturated organic acid and polymerizable olefins.

20. The crosslinkable powder according to claim 19 wherein said polymer is partially neutralized.

21. The crosslinkable powder according to claim 16 wherein said polyolefin is polyethylene modified with acrylic acid grafted thereon.

22. The crosslinkable powder according to claim 16 comprising from about 99.95 to 98.0 weight percent of said polymeric material and from about 0.05 to 2.0 weight percent of said organic peroxide.

23. The crosslinkable powder according to claim 22 wherein said organic peroxide is 2,5-dimethyl-2,5-di(t-butyl peroxy) hexane.

24. A crosslinkable powder comprising a major amount of porous polymeric particles of organic functional thermoplastic polymer said polymer particles being less than 100 microns in size and having a decomposition point higher than 100° C. and having sorbed into each of the porous polymer particles a minor amount of a functional organosilane capable of interacting with the functionality of said polymer.

* * * * *